United States Patent Office 3,637,863
Patented Jan. 25, 1972

3,637,863
3,5-DI-t-BUTYL-4-HYDROXYBENZYL
PHENYL SULFIDES
Harry Braus, Springdale, and Jay R. Woltermann, Cincinnati, Ohio, assignors to National Distillers and Chemical Corporation, New York, N.Y.
No Drawing. Filed Nov. 22, 1967, Ser. No. 684,918
Int. Cl. C07c *149/36*
U.S. Cl. 260—609 F                         3 Claims

ABSTRACT OF THE DISCLOSURE

Compound having the formula

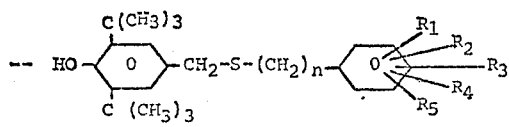

$n$ is a positive integer ranging from 0 to 22; and $R_1$, $R_2$, $R_3$, $R_4$ and $R_5$ is each H or an alkyl radical having 1 to 22 carbon atoms which may be straight chain or branched. These compounds are useful for stabilizing organic materials.

---

This invention relates to novel compounds and to their use as stabilizers for organic materials. More particularly, this invention is concerned with the use of these compounds as stabilizers and antioxidants for olefin polymers and to the polymer compositions stabilized therewith.

A rapidly expanding industry utilizing polyolefin resins has created a need for stabilizers that will render the finished articles of manufacture more useful, more versatile in application, and more nearly permanent. Polymers of aliphatic olefins have a combination of properties, such as high resistance to stress cracking, high tensile strength, and stability under load, that makes them useful in the manufacture of pipe, film wire, coatings, or various molded objects such as bottles and the like.

These polyolefins, however, are subject to considerable degradation at the high temperatures that are required in their processing or that may be encountered by the finished articles. They may also be degraded by chain cleavage resulting from oxidation or attack by acids. The molecular breakdown which occurs in these polymers during fabrication is usually evidenced by increased brittleness at low temperature and reduced tensile strength and dielectric properties.

It is customary to incorporate small amounts of stabilizers into the polymer to improve the resistance thereof to thermal and oxidative degradation, such as various amines, diaryl sulfides, phenolic compounds, organic phosphites, and the like. Many of the known stabilizers, however, do not provide the required stabilizing effect, while others impart undesired color to the stabilized compositions.

In accordance with this invention, it has been found that a variety of organic materials can be stabilized against thermal and oxidative degradation by incorporating into the polymer composition a small amount of a compound having the formula

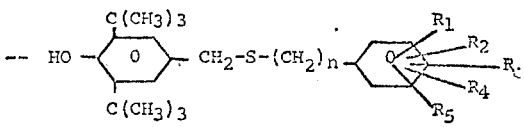

$n$ is a positive integer ranging from 0 to 22; and $R_1$, $R_2$, $R_3$, $R_4$ and $R_5$ is each H or an alkyl radical having 1 to 22 carbon atoms which may be straight chain or branched.

The resulting stabilized compositions can be processed under conditions of elevated temperature and mechanical working without substantial increase in the melt flow rate and without important color change.

Specific examples of the stabilizers of this invention include such compounds as 3,5 - di - t - butyl-4-hydroxybenzyl-2-methyl-4-t-butylphenyl sulfide having the formula

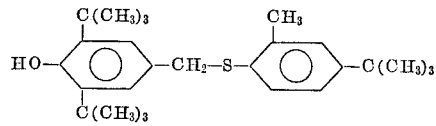

3,5-di-t-butyl-4-hydroxybenzylphenyl sulfide having the formula

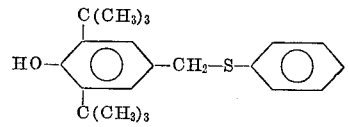

and 3,5-di-t-butyl-4-hydroxybenzyl-p-t-butylphenyl sulfide having the formula

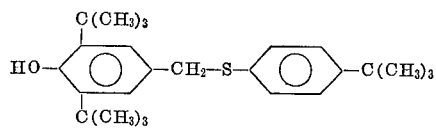

Although this invention will be described with regard to use of the novel compounds as stabilizers for polyolefins, it is to be understood that the compounds are suitable also as stabilizers for other materials, such as elastomers, including both natural and synthetic rubbers; synthetic resins, e.g., vinyl resins, polystyrene, polyamides, polyacetals, and polyesters; fats; gasolines; waxes; soaps; oils; greases; and so forth.

The materials with which this invention will be illustrated are normally solid homopolymers and copolymers of aliphatic olefins having from 2 to 8 carbon atoms per molecule, such as ethylene, propylene, 1-butene, isobutylene, 2-butene, 1-pentene, and 1-hexene, and mixtures thereof.

In general the amount of agent to be added to the polyolefin depends upon the degree and kind of stabilization desired. The amount of antioxidant can vary from about 0.001 to about 5.0 percent, based on the weight of the polyolefin, with amounts of approximately 0.05 to 0.5 percent being preferred. As a rule, it is preferred to use the minimum amount required to achieve the desired results.

The compounds of this invention can be mixed with the polyolefin in any suitable manner that will effect thorough distribution and dispersion. This can be accomplished in equipment suitable for mixing solids, as by milling the polyolefin with the additive on heated rolls such as are used in the compounding of rubber or on other suitable milling or mixing equipment, such as for example a Banbury mixer or conventional rubber mill. Instead of adding the stabilizing agent to the polymer in the solid or molten state, it can be added to a solution or suspension of polymer in an organic solvent or to an aqueous dispersion thereof and the volatile solvent subsequently removed by vaporization.

The antioxidants of this invention may be supplemented by small amounts of finely dispersed particles of carbon black to shield the polyolefin from the deleterious degradative effects of ultraviolet radiation, thereby improving its resistance to light deterioration. Carbon black suitable for use herein includes both activated and unactivated types, such as channel carbon black, furnace carbon black, animal or vegetable carbon black, thermal carbon black, light lamp blacks, acetylene blacks, and the like, and carbon blacks activated in the presence of such materials as oxygen, sulfur, or selenium. The average particle size of carbon black used herein should be below about 1000 angstroms and preferably below about 200 angstroms, so as to ensure a uniform dispersion of the carbon black through the polymer. Amounts of carbon black within the range of about 0.05 to 5.0 percent by weight of the polymer, and preferably about 0.1 to 3.0 percent, are satisfactory. For some polyethylene applications, carbon black concentrations of up to about 50 percent by weight can be present, especially where partially conductive polyethylene-carbon black compounds are employed.

The preparation of the novel stabilizers and their use in polyolefin resin compositions are illustrated by the examples which follow. It is to be understood, however, that these examples are given solely for the purpose of illustration and that the invention is not to be regarded as being limited to any of the specific materials or conditions recited therein except as set forth in the appended claims.

EXAMPLE I

Into a 2-liter, 3-necked Morton flask equipped with a stirrer, thermometer, $N_2$ inlet, reflux condenser, and addition funnel was added 9.2 grams of sodium (0.4 M) in 200 ml. of ethanol. When solution was completed, the flask was cooled to 10° C., and 71.3 grams of 4-t-butyl-2-methylthiophenyl (0.4 M) was added. The flask was then cooled to 20° C., and 101.9 grams of 3,5-di-t-butyl-4-hydroxybenzyl chloride, prepared by the method disclosed by N. P. Neureiter in J. Org. Chem. 28, 3486–90 (1963), in 50 ml. of ethanol was added dropwise. The flask was stirred for several minutes after the addition was complete (pH 7.5). The precipitated salt was washed with water and the water solution extracted with benzene. The benzene was washed, dried, and evaporated. The product, 3,5-di-t-butyl-4-hydroxybenzyl-2-methyl-4-t-butylphenyl sulfide, was a light colored solid; a small sample was recrystallized and melted at 83.5–85° C.

*Analysis.*—Calculated for $C_{26}H_{38}OS$ (percent): C, 78.33; H, 9.61; S, 8.04. Found (percent): C, 78.52; H, 9.61; S, 7.90.

EXAMPLE II

The procedure of Example I was repeated except that 44.1 grams of benzenethiol (0.4 M) was used instead of 71.3 grams of 4-t-butyl-2-methylthiophenyl. The product, 3,5-di-t-butyl-4-hydroxybenzylphenyl sulfide, melted at 64.5–66° C.

*Analysis.*—Calculated $C_{21}H_{28}OS$ (percent): C, 76.78; H, 8.59; S, 9.76. Found (percent): C, 77.00; H, 8.62; S, 9.5.

EXAMPLE III

The procedure of Example I was repeated except that 60.5 grams of 4-t-butylthiophenyl (0.4 M) was used instead of 71.3 grams of 4-t-butyl-2-methylthiophenyl. The product was 3,5-di-t-butyl-4-hydroxybenzyl-p-t-butylphenyl sulfide.

*Analysis.*—Calculated for $C_{25}H_{36}OS$ (percent): C, 78.07; H, 9.64; S, 8.34. Found (percent): C, 78.04; H, 9.37; S, 8.54.

A satisfactory antioxidant should hold the chemical and physical properties of the original organic material during an accelerated oxidation testing procedure, generally up to three hours' duration. For the following examples, the test procedure consisted of milling one pound of polyethylene in air on a two-roll laboratory mill having a front roll speed of 25 r.p.m. and a back roll speed of 35 r.p.m. with the distance between the two rolls adjusted to maintain a uniform rolling back in the nip and a mill temperature of 320° F. After the polymer started to melt, 300 p.p.m. of the antioxidant was added. Samples (75 grams) were taken after 5, 30, 60, 90, and 180 minutes, and melt index and weight percent carbonyl was determined. The melt index demonstrates the holding characteristics for the physical properties of the polymer; the carbonyl values, the holding of the chemical properties.

EXAMPLE IV

| Sample | Melt Index ($MI_{10}$) after (minutes)— | | | | | Percent of C=O after (minutes)— | | | | |
|---|---|---|---|---|---|---|---|---|---|---|
| | 5 | 30 | 60 | 90 | 180 | 5 | 30 | 60 | 90 | 180 |
| A [1] | 5.6 | 4.4 | 1.6 | 0.26 | 1.4 | .019 | .027 | .043 | .10 | .48 |
| B [2] | 5.7 | 5.1 | 3.6 | 1.5 | 0.29 | .019 | .02 | .039 | .046 | .41 |
| C [3] | 5.4 | 3.4 | 1.8 | 0.47 | 3.1 | .018 | .016 | .038 | .083 | .405 |
| D [4] | 5.4 | 5.0 | 3.0 | 1.2 | 1.3 | .013 | .019 | .028 | .057 | .35 |
| E [5] | 1.6 | 2.8 | 4.3 | 4.7 | 5.1 | .013 | .14 | .16 | .23 | .70 |

[1] A is polyethylene plus 3,5-di-t-butyl-4-hydroxybenzyl-2-methyl-4-t-butylphenyl sulfide (solids).
[2] B is polyethylene plus 3,5-di-t-butyl-4-hydroxybenzyl-2-methyl-4-t-butylphenyl sulfide (liquid).
[3] C is polyethylene plus 3,5-di-t-butyl-4-hydroxybenzylphenyl sulfide.
[4] D is polyethylene plus 3,5-di-t-butyl-4-hydroxybenzyl-p-t-butylphenyl sulfide.
[5] E is polyethylene with no stabilizer.

As can be seen from these data, polyethylene with no stabilizer (Sample E) shows poor mill stability and high carbonyl formation at a fast rate. Sample A, B, C, and D containing the same polyethylene as Sample E plus the novel stabilizing compounds of this invention have retained their original chemical and physical properties as evidenced by the figures for melt index and weight percent of C=O, thus showing the effectiveness of these additives as stabilizers.

What is claimed is:
1. 3,5 - di-t-butyl - 4-hydroxybenzyl-2-methyl-4-t-butylphenyl sulphide.
2. 3,5 - di-t-butyl-4-hydroxybenzylphenyl sulfide.
3. 3,5 - di-t-butyl - 4 - hydroxybenzyl-p-t-butylphenyl sulfide.

References Cited
UNITED STATES PATENTS 2,417,118    3/1947    McCleary et al. _____ 260—609
3,272,869    9/1966    O'Shea _____ 260—609 XR CHARLES B. PARKER, Primary Examiner D. R. PHILLIPS, Assistant Examiner U.S. Cl. X.R.

44—76; 252—48.2; 260—45.95, 398.5, 814